(12) United States Patent
Takahashi et al.

(10) Patent No.: US 7,687,966 B2
(45) Date of Patent: Mar. 30, 2010

(54) OPTIMIZED STATOR MOUNTING METHOD TO PRINTED CIRCUIT BOARD

(75) Inventors: Eiko Takahashi, Nagano (JP); Jonn Herzberger, Tempe, AZ (US)

(73) Assignee: Minebea Co., Ltd. (JP)

(*) Notice: Subject to any disclaimer, the term of this patent is extended or adjusted under 35 U.S.C. 154(b) by 0 days.

(21) Appl. No.: 12/121,786

(22) Filed: May 16, 2008

(65) Prior Publication Data
US 2009/0284088 A1    Nov. 19, 2009

(51) Int. Cl.
*H02K 7/00* (2006.01)
*H02K 1/12* (2006.01)
(52) U.S. Cl. .................. 310/216.049; 310/67 R; 310/215; 310/254
(58) Field of Classification Search ............. 310/67 R, 310/68 R, 215, 216–218, 254, 258–259, 216.049; 360/98.07, 99.01, 99.04, 99.08
See application file for complete search history.

(56) References Cited
U.S. PATENT DOCUMENTS
5,679,996 A * 10/1997 Strobl ............... 310/237
5,783,881 A * 7/1998 Best et al. ........... 310/68 C
6,144,135 A * 11/2000 Ho .................... 310/254
2002/0113519 A1    8/2002 Brown

* cited by examiner

*Primary Examiner*—Quyen Leung
*Assistant Examiner*—Leda Pham
(74) *Attorney, Agent, or Firm*—Townsend and Townsend and Crew LLP

(57) ABSTRACT

A stator assembly detachably mounted with a fan housing. The stator assembly includes a stator including one or more first mounting feet and one or more second mounting feet disposed apart from each other. Additionally, the stator assembly includes a printed circuit board (PCB) having one or more first openings and a fan housing having a base member fixed to a bearing liner. The base member includes one or more second openings disposed about the bearing liner. The stator is coupled to the PCB into a stator-PCB assembly with each of the one or more first mounting feet being locked with one of the one or more first openings. The stator-PCB assembly is center-aligned with respect to the bearing liner and coupled to the fan housing with each of the one or more second mounting feet locked with one of the one or more second openings.

20 Claims, 10 Drawing Sheets

US 7,687,966 B2

OPTIMIZED STATOR MOUNTING METHOD TO PRINTED CIRCUIT BOARD

BACKGROUND OF THE INVENTION

The present invention relates generally to manufacturing of fan motor products, and in particular to stator assembly detachably mounted with a fan housing.

One aspect of any product manufacturing is to continuously improve assembly efficiency while keeping easy disassembly as an option for possible rework. When manufacturing fan products, stator assemblies of fan motors conventionally were glued onto the bearing liner. There are some problems associated with such a manufacturing technique. One major problem is that the glue process is subject to production variances. Especially, the amount of glue applied for the above process is hard to keep consistent, thus introducing various quality control issues. Another major problem is, once the stator assembly is glued on to a structure member of a fan housing, rework of the stator assembly including a printed circuit board (PCB) becomes very difficult.

From the above, it is seen that improved mounting techniques are highly desired.

BRIEF SUMMARY OF THE INVENTION

The present invention relates generally to improvement of manufacturing techniques for fan motor products, and in particular to an stator assembly detachably mounted with a fan housing.

Embodiments according to the invention provide a stator assembly detachably mounted with a fan housing. The stator assembly includes a stator, one or more first mounting feet, and one or more second mounting feet. In a specific embodiment, the stator includes a first central hole. The one or more first mounting feet are disposed about the first central hole and the one or more second mounting feet are disposed apart from the one or more first mounting feet. The stator assembly further includes a printed circuit board (PCB). The PCB includes a second central hole and one or more first openings disposed about the second central hole. Additionally, the stator assembly includes a fan housing having a base member fixedly coupled to a bearing liner. The base member includes one or more second openings disposed about the bearing liner. In one embodiment, the stator is coupled to the PCB into a stator-PCB assembly with each of the one or more first mounting feet being locked with one of the one or more first openings. The stator-PCB assembly is coupled to the fan housing with each of the one or more second mounting feet locked with one of the one or more second openings. The stator-PCB assembly is disposed with both the first central hole and the second central hole center-aligned with respect to the bearing liner.

In another specific embodiment according to the present invention a stator assembly kit is provided. The stator assembly kit includes a stator-PCB assembly including a stator co-axially coupled to a printed circuit board (PCB). The stator includes one or more first mounting feet disposed apart from each other and one or more second mounting feet disposed apart from the one or more first mounting feet. The PCB includes one or more first openings aligned with the one or more first mounting feet and one or more second openings aligned with the one more second mounting feet. Additionally, the stator assembly kit includes a fan housing including a base member having one or more third openings. Moreover, the stator assembly kit includes a disassembly tool including a plate having one or more release keys. In one embodiment, each of the one or more first mounting feet is locked on one of the one or more first openings with a first standoff distance between the stator and the PCB. Each of the one or more second mounting feet is passed through one of the one or more second openings and extended further to lock on one of the one or more third openings with a second standoff distance between the base member and the PCB. Each of the one or more release keys is configured to unlock each of the one or more second mounting feet from the one of the one or more third openings, thereby releasing the stator-PCB assembly from the base member.

Many benefits can be achieved by embodiments of the present invention. Certain embodiments of the invention provide a simple structural combination of two types of mounting feet for the stator so that the stator can be mounted with a PCB and to a stator assembly housing in separated positions. Specific embodiments of the invention provide a locking mechanism associated with a first type of mounting feet of the stator for forming a stator-PCB assembly in which the PCB is detachably coupled to the stator with a standoff distance. At the same time, the embodiments provide another locking mechanism associated with a second type of mounting feet of the stator for easily assembling or disassembling the stator-PCB assembly to a base member of the fan housing. The stator-PCB assembly is detachably mounted to the base member with another standoff distance. Some embodiments of the invention show mounting feet structural designs utilizing one or more exemplary snap fitting mechanisms for achieving the desired locking. Alternatively, embodiments of the invention provide an improved mounting method over conventional technique requiring to glue the stator assembly onto a bearing liner. In particular, the improved mounting method is able to, but not limited to, improve manufacturing efficiency and product quality control for various fan motor products.

DETAILED DESCRIPTION OF THE INVENTION

The present invention relates generally to manufacturing of fan motor products, and in particular to a stator assembly detachably mounted with a fan housing.

Figure 1:
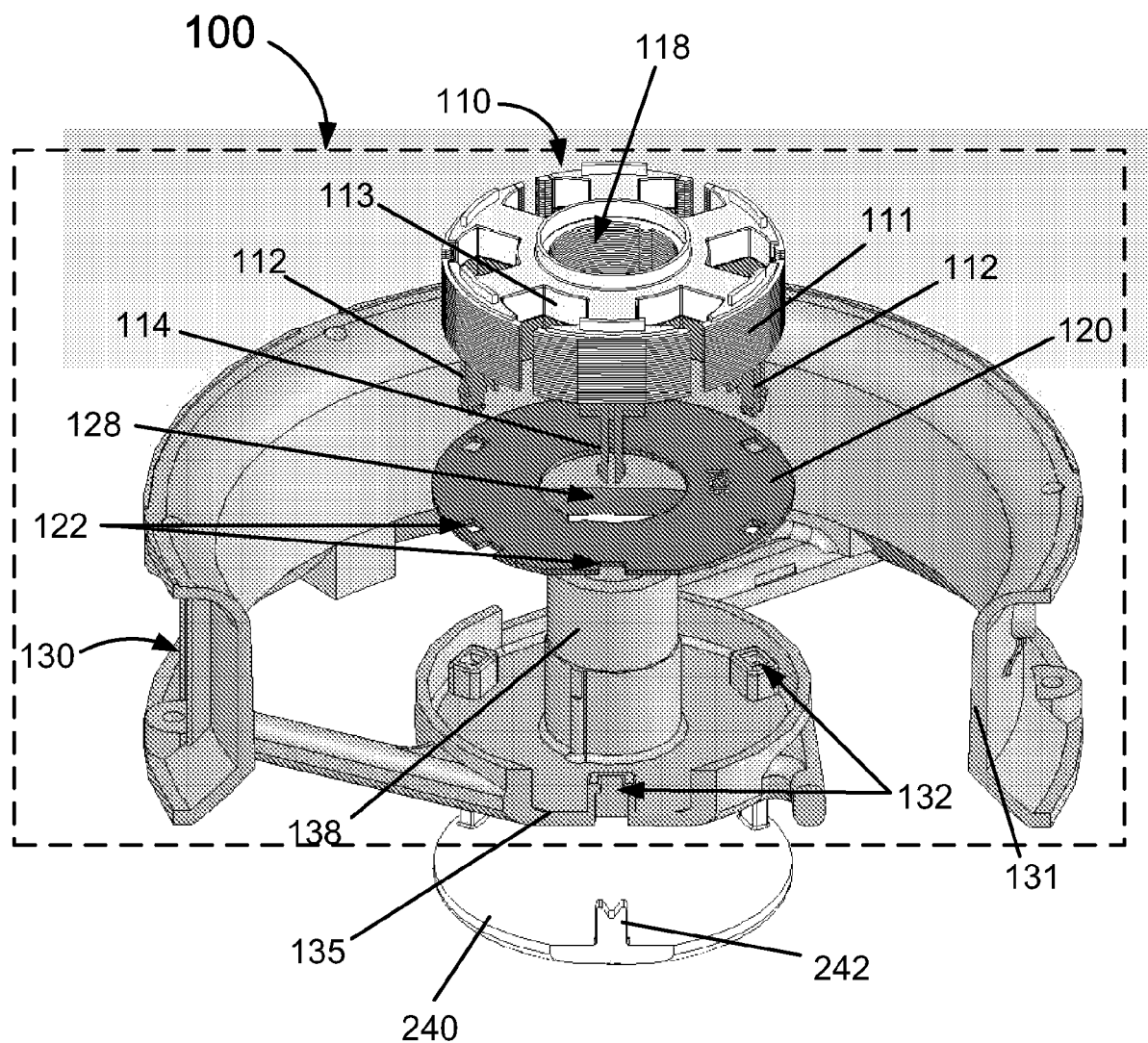
FIG. 1 is a perspective view with a cutaway portion illustrating a stator assembly in a partially disassembled fan motor according to an embodiment of the invention.

FIG. 1 is a perspective view with a cutaway portion illustrating a stator assembly in a partially disassembled fan motor according to an embodiment of the invention. This diagram is merely an example, which should not unduly limit the scope of the claims herein. One of ordinary skill in the art would recognize many variations, alternatives, and modifications. Shown here is an exploded view of a partially disassembled fan motor 100, comprising several components: a stator sub-assembly 110 (coils not shown), a printed circuit board (PCB) 120, a fan housing 130 having a surrounding side wall 131 coupled with a base member 135. The base member 135 is disposed at a center-bottom region of the fan housing 130 and vertically coupled to a bearing liner 138 about a central axis. Shown in FIG. 1, a disassembly tool 240 is also shown to associate with the partially disassembled fan motor 100. In one embodiment, the stator sub-assembly 110 comprises a plurality of laminated metal sheets 111 capped by a top half and a bottom half of an insulator shell 113 and shaped substantially symmetrically around a central hole 118. Although, coils are not shown in stator sub-assembly 110, the full assembled stator should not be affect the mounting and other relationships to its neighboring components. From now and forward in the spec, the stator sub-assembly can be simply exchangeable with a stator. The central hole 118 is configured to be fitted through the bearing liner 138. Additionally, the PCB 120 has a central hole 128 disposed between stator sub-assembly 110 and base member 135. Both the central hole 128 and the central hole 118 are aligned with the central axis associated with the bearing liner 138.

In one embodiment, the stator 110 further includes several mounting feet respectively disposed apart from each other at the bottom half of the insulator shell 113. A portion of the mounting feet are configured to mount the stator with the PCB to form a stator-PCB assembly. Other portions of the mounting feet are configured to couple the stator-PCB assembly with the fan housing. In accordance to the present invention these mounting feet are also configured to allow easy disassembly of the stator-PCB assembly from the fan housing. In a specific embodiment, these mounting feet can be classified into at least two types: a first type includes one or more first mounting feet 112 disposed spaced apart from each other and extended from the bottom half of the stator insulator shell 113; a second type includes one or more second mounting feet 114 disposed spaced apart from the one or more first mounting feet 112 and extended from the same bottom half of the stator insulator shell 113. In another specific embodiment, the one or more first mounting feet 112 are configured to mount stator 110 with PCB 120 and at the same time the one or more first mounting feet 114 are capable of mounting stator 110 with fan housing 130.

For example, one or more first mounting feet 112 are disposed around an outside region of the stator insulator shell 113 about the central hole 118 and are symmetrically distributed with a certain spacing. At the same time, one or more first mounting feet 114 are disposed at positions around the outside region of the stator insulator shell 113 alternative to those positions of the one or more first mounting feet 112. In another example, the first mounting feet 112 are configured to be fastened with the PCB 120 via a detachable locking mechanism. While the second mounting feet 114 are configured to be locked with the base member 135 via another detachable locking mechanism. More detail about the mounting feet structures and associated locking mechanisms is given below.

Referring to FIG. 1, the PCB 120 includes multiple openings 122 disposed in its layout respectively for engaging with one of the mounting feet via a corresponding locking mechanism. In one example, the multiple openings 122 includes at least one or more first openings, each of which is disposed in proper position for mating with one of the one of the one or more first mounting feet 112. In another example, the multiple openings 122 also include one or more second openings, each of which is aligned with one of the one or more second mounting feet 114. In an embodiment, for the convenience of manufacturing, the multiple openings 122 can be have substantially a same lateral shape and dimensions. For example, each of the multiple openings 122 has a simple rectangular shape with certain widths in both sides. The widths of each opening 122 are sufficient for at least allowing a free-passage of the one of the one or more first mounting feet 112 or one or more second mounting feet 114. But, one of ordinary skill in the art should recognize that other geometric shapes and dimensions of these openings are possible depending on specific mounting feet design and locking mechanism.

Referring to FIG. 1 again, the base member 135 includes one or more openings 132 disposed in proper positions aligned with the one or more second mounting feet 114. The base member 135 can be varied in its mechanical structure and made of various types of materials, typically of metals or hard plastics. In one example, the base member 135 is fixedly coupled to bearing liner 138, which is vertically extended from a center of base member 135 along the center axis direction. Such configuration allows the bearing liner 138 to pass through both central hole 118 and central hole 128 when stator 110 and PCB 120 are assembled together in fan motor. At the same time, the base member 135 is also fixedly coupled to side wall 131 of the fan housing 130 to receive necessary mechanical support to itself as well as the to-be-mounted stator-PCB assembly.

The one or more openings 132 on the base member 135 can have varied geometric structures. For example, each opening 132 has its shape and lateral dimensions configured to be engaged with and subsequently be locked by one of the one or more second mounting feet 114. In particular in association with a specific assembly method each opening 132 includes an L-shaped edge portion for engaging with an end structure of the second mounting feet. In association with a specific disassembly method, each opening 132 may also include a length in its side wall so that a release key 242 of disassembly tool 240 can be applied to release the second mounting feet 114 from the opening 132. Therefore, the specific structure of the opening 132 becomes an integral part of a locking mechanism associated with a combination of one of the second mounting feet 114 and one of the openings 132. The locking mechanism between the stator-PCB assembly and the fan housing is substantially removable according to embodiments of the present invention.

Figure 2:
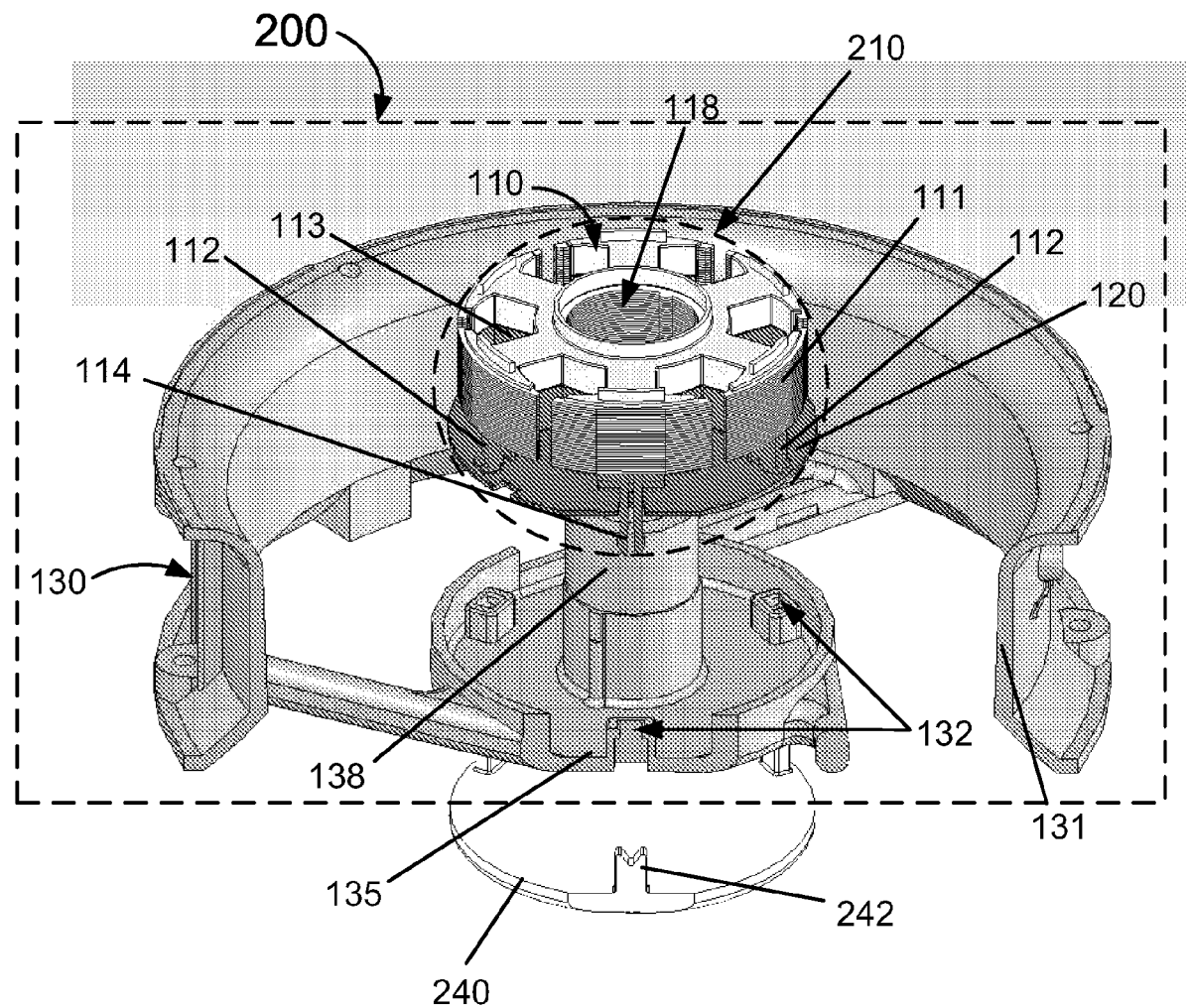
FIG. 2 is a perspective view with a cutaway portion illustrating a stator-PCB assembly in a partially disassembled fan motor according to an embodiment of the invention.

FIG. 2 is a perspective view with a cutaway portion illustrating a stator-PCB assembly in a partially disassembled fan motor according to an embodiment of the invention. This diagram is merely an example, which should not unduly limit the scope of the claims herein. One of ordinary skill in the art would recognize many variations, alternatives, and modifications. As an example, the partially assembled fan motor 200 is substantially the same as the partially disassembled fan motor 100 having the stator sub-assembly 110 and the PCB 120 in a different partially disassembled state. Specifically as shown in FIG. 2, the fan motor 200 includes a stator-PCB assembly 210 in which two of the first mounting feet 112 of the stator 110 respectively lock into two of the openings 122 on the PCB 120 while one of the second mounting feet 114 of the stator 110 passes through another opening 122 on the PCB 120. The second mounting feet 114 is also aligned with one of openings 132 on the base member 135 while the central hole 118 of the stator 110 is aligned with the bearing liner 138.

Figure 3:
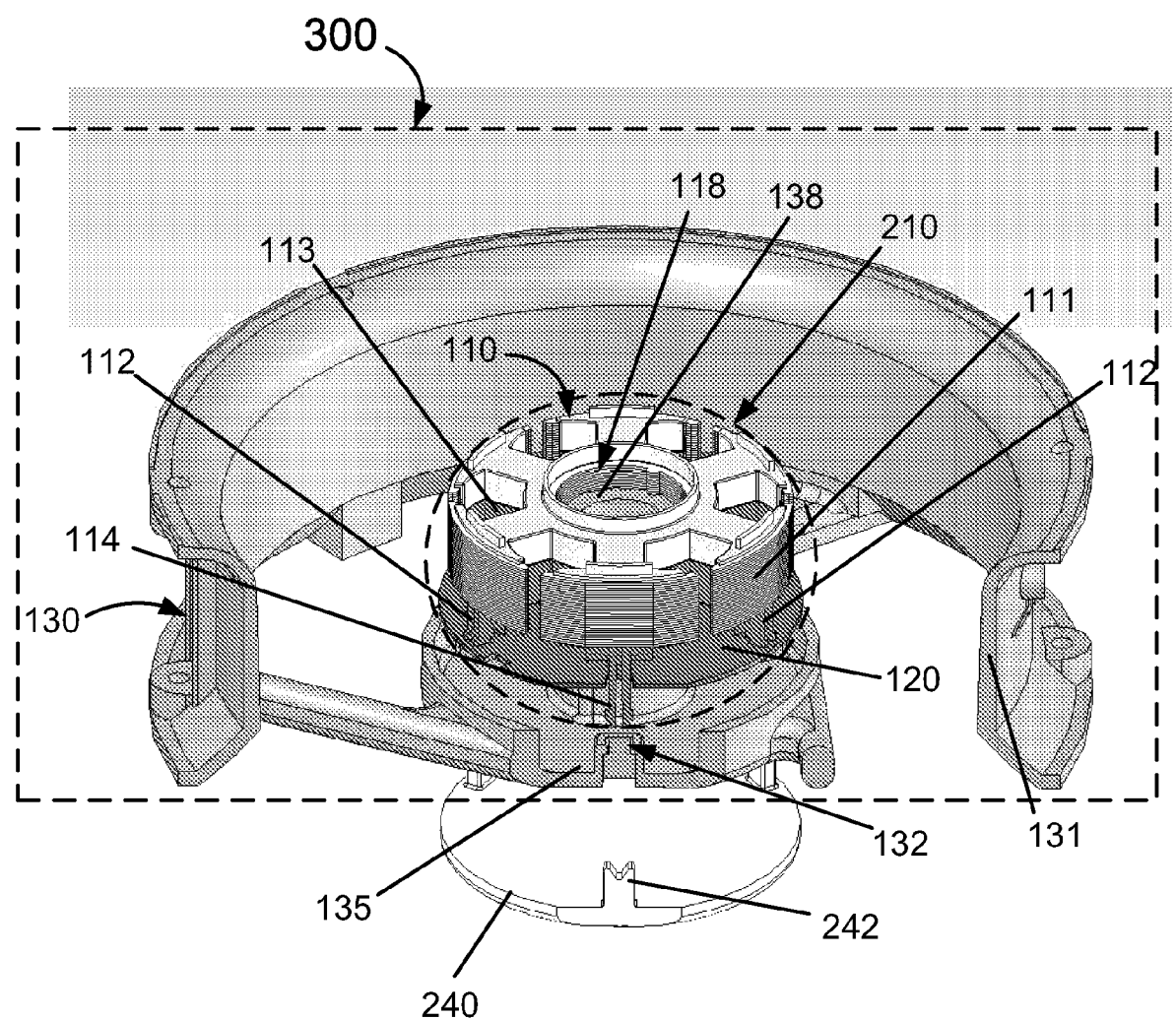
FIG. 3 is another perspective view with a cutaway portion illustrating a stator-PCB assembly in a partially disassembled fan motor according to another embodiment of the invention.

FIG. 3 is another perspective view with a cutaway portion illustrating a stator-PCB assembly in a partially disassembled fan motor according to another embodiment of the invention. This diagram is merely an example, which should not unduly limit the scope of the claims herein. One of ordinary skill in the art would recognize many variations, alternatives, and modifications. As an example, the partially assembled fan motor 300 is substantially the same as the partially disassembled fan motor 100 or partially assembled fan motor 200 having the stator sub-assembly 110 and the PCB 120 in another different partially disassembled state. In particular, the stator-PCB assembly 210 now is to engage with base member 135 with bearing liner 138 fitted through central hole 118 of stator 110 (as well as central hole 128 of PCB 120, which is not visible in FIG. 3) while one of the second mounting feet 114 is aligned with one of the openings 132 on the base member 135. Within the stator-PCB assembly 210, the PCB 120 is substantially locked by the one or more first mounting feet 112 within the one or more openings 122.

Figure 4A:
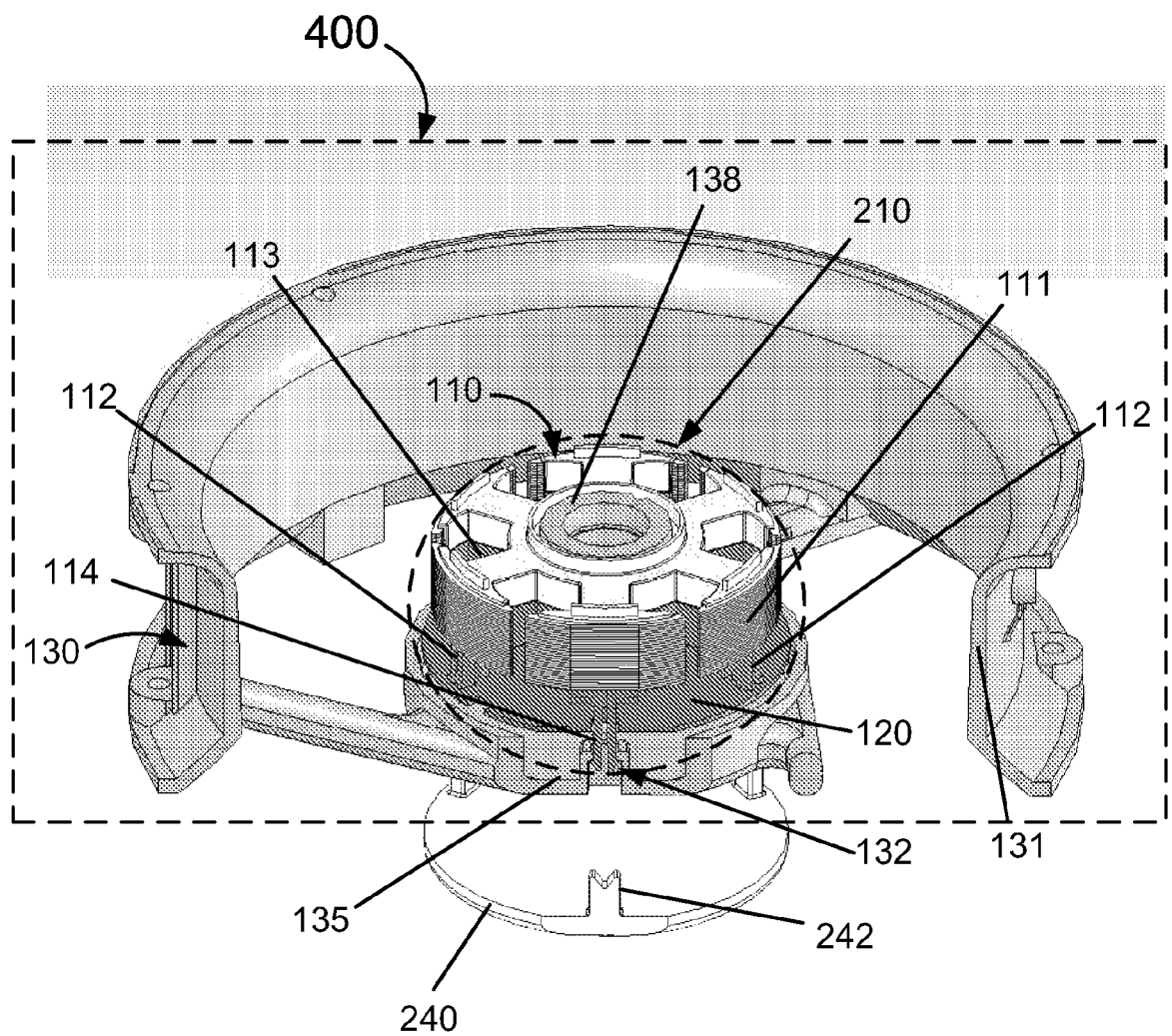
FIG. 4A is a perspective view with a cutaway portion illustrating the stator-PCB assembly assembled within a fan housing according to an embodiment of the invention.

FIG. 4A is a perspective view with a cutaway portion illustrating the stator-PCB assembly assembled within a fan housing according to an embodiment of the invention. This diagram is merely an example, which should not unduly limit the scope of the claims herein. One of ordinary skill in the art would recognize many variations, alternatives, and modifications. In an example, the partially assembled fan motor 400 is substantially the same as the partially disassembled fan motor 100, or 200, or 300 shown earlier but in a different assembly state. Within the partially assembled fan motor 400 the stator-PCB assembly 210 shown in FIG. 3 has been assembled with the base member 135. In particular, each of the one or more second mounting feet 114 of stator sub-assembly 110 is inserted through and locked with one of the one or more openings 132 on the base member 135. At the same time an end region of the bearing liner 138 is now visible being substantially level with the top half of the stator insulator shell 113 as bearing liner 138 is fully inserted through central hole 118 of stator 110. Of course, there can be alternative ways to mount PCB 120 with stator 110. For example, the PCB with a central hole can be in fact disposed above stator with the end region of the bearing liner being inserted through and substantially level with the central hole of the PCB.

Figure 4B:
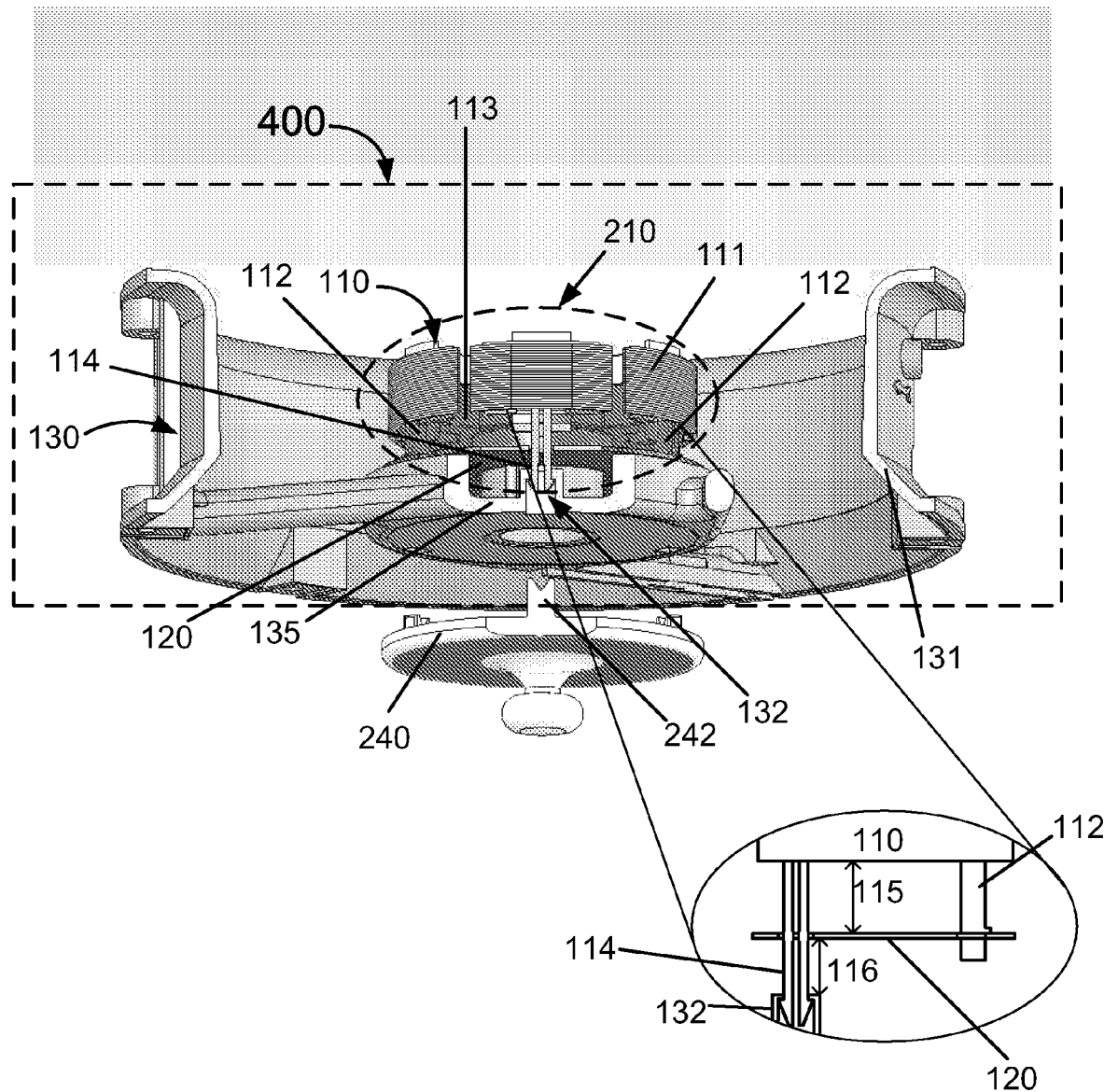
FIG. 4B is another perspective view with a cutaway portion illustrating the stator-PCB assembly assembled within a fan housing shown in FIG. 4A.

FIG. 4B is another perspective view with a cutaway portion illustrating the stator-PCB assembly assembled within a fan housing shown in FIG. 4A. This diagram is merely an example, which should not unduly limit the scope of the claims herein. One of ordinary skill in the art would recognize many variations, alternatives, and modifications. As an example, the partially assembled fan motor 400 is shown from a different perspective angle in the same assembly state shown in FIG. 4A. It is visible, shown in a detailed sectional view, that within the partially assembled fan motor 400 the stator-PCB assembly 210 includes a standoff distance 115 between stator 110 and PCB 120 and another standoff distance 116 between PCB 120 and the opening 132 (or a portion of the base member 135). In particular, the second mounting feet 114 has a length longer than that of the first mounting feet 112. In other words, as the first mounting feet 112 are locked at the opening 122 of PCB 120 the second mounting feet 114 are extended beyond the PCB 120 to be locked at the opening 132 of the base member 135. In one specific embodiment, the PCB 120 includes additional openings aligned with the second mounting feet 114, each allowing a passage by one of the one or more second mounting feet 114 before the engagement with one of the opening 132. In another specific embodiment, the standoff distance 115 is associated with a specific locking mechanism between an end structure of one of the first mounting feet 112 and one of the openings 122 in the PCB; the standoff distance 116 is associated with another specific locking mechanism between another end structure of one of the second mounting feet 114 and the opening 132. In this case, the length of the second mounting feet 114, measured from the stator 110 to corresponding end structure inside the opening 132, is substantially equal to a sum of the two standoff distances 115 and 116. In an alternative embodiment, if the PCB 120 is mounted on different side of the stator 110 then each of the one or more second mounting feet 114 can directly lock with one the openings 132. In this case, the length of the second mounting feet 114 can be substantially the same as the standoff distance 116.

Figure 5:
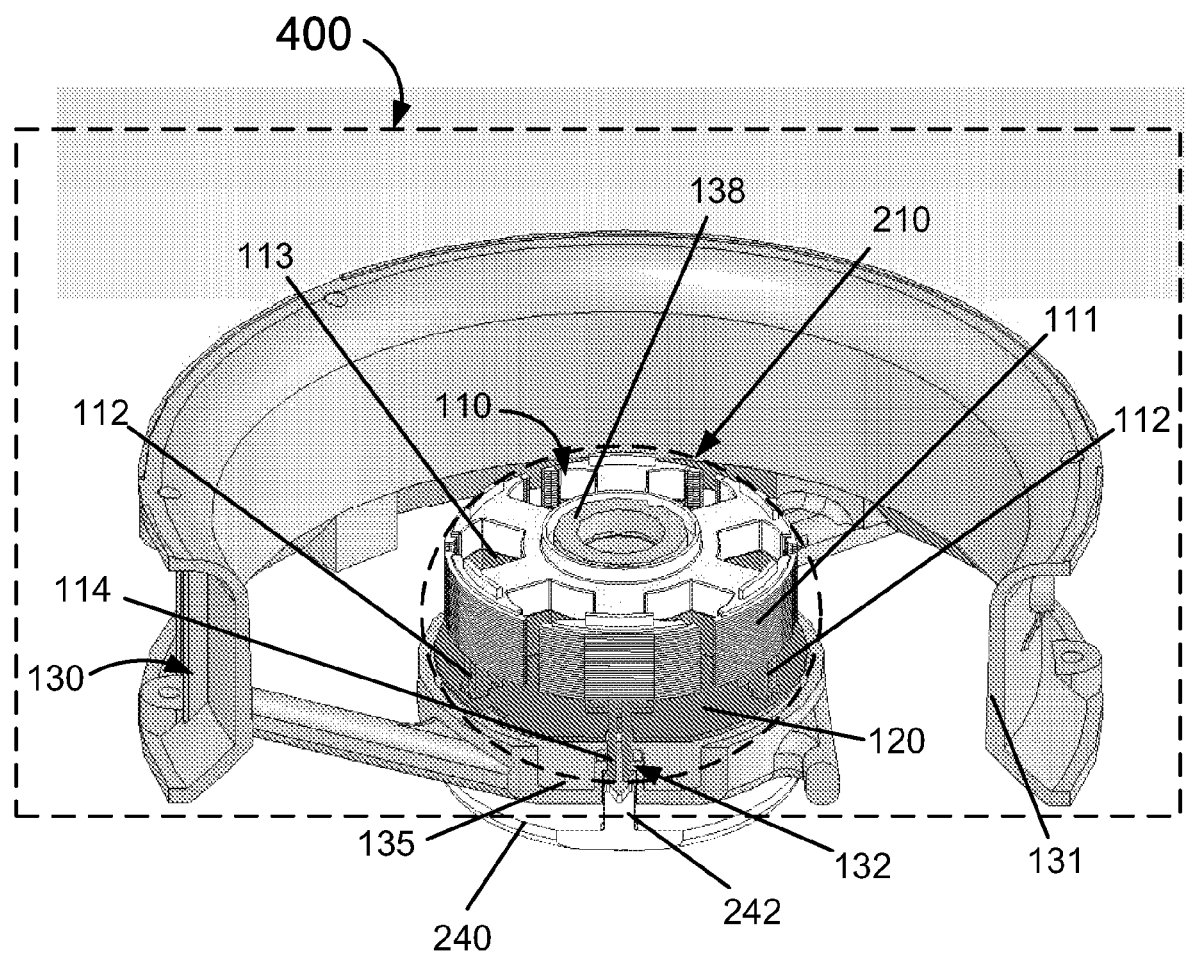
FIG. 5 is a perspective view with a cutaway portion illustrating a partially assembled fan motor with a stator-PCB assembly being engaged by a disassembly tool according to an embodiment of the invention.

FIG. 5 is a perspective view with a cutaway portion illustrating a partially assembled fan motor with a stator-PCB assembly being engaged by a disassembly tool according to an embodiment of the invention. This diagram is merely an example, which should not unduly limit the scope of the claims herein. One of ordinary skill in the art would recognize many variations, alternatives, and modifications. As shown, the partially assembled fan motor 400 is subject to an engagement of the disassembly tool 240 from bottom of the base member 135 (an exterior side of the fan housing 130). The disassembly tool 240 can be supplied together with the stator, PCB, and fan housing as a complete stator assembly kit for manufacture of a fan motor. In one specific embodiment, user of the stator assembly kit can easily apply, when necessary, the disassembly tool 240 to unlock the one or more second mounting feet 114 from the openings 132 on the base member 135. Subsequently, the stator-PCB assembly 210 can be released from the base member 135 of fan housing 130. This disassembly process was very difficult for convention glued stator assembly. In terms of the functionality of the disassembly tool, a plurality of release keys 242 are disposed on one side of the disassembly tool to align with corresponding openings 132. Each of the plurality of release keys 242 comprises a protruded structure with a predetermined head shape. The protruded structure is configured to be guided into the openings 132 from opposite direction relative to the second mounting feet 114. The predetermined head shape of the release key 242 is configured to mate and interact with the end structure of the second mounting feet 114 so that the latter can be released from the opening 132 after the interaction. More detail description about the locking/releasing mechanism between the second mounting feet and the base member are given below.

Figure 6:
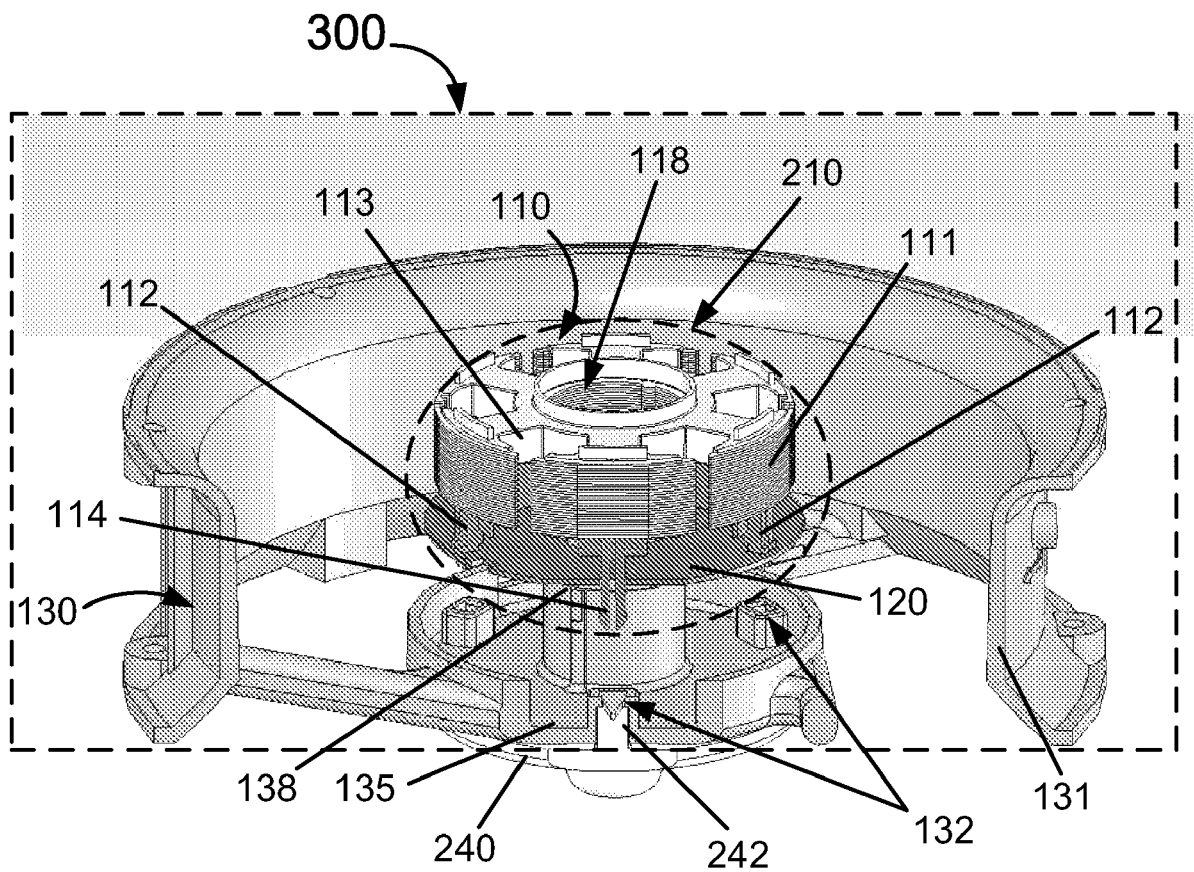
FIG. 6 is a perspective view with a cutaway portion illustrating a partially assembled fan motor with the stator-PCB assembly being released by the disassembly tool shown in FIG. 5.

FIG. 6 is a perspective view with a cutaway portion illustrating a partially assembled fan motor with the stator-PCB assembly being released by the disassembly tool shown in FIG. 5. This diagram is merely an example, which should not unduly limit the scope of the claims herein. One of ordinary skill in the art would recognize many variations, alternatives, and modifications. As shown, the same stator-PCB assembly 210 shown in FIG. 5 is released from the fan housing 130 by the disassembly tool 240 to form a partially disassembled fan motor that is substantially the same as a partial disassembled fan motor 300. In particular, each of the one or more second mounting feet 114 is unlocked from corresponding one of the one or more opening 132 in the base member 135 of the fan housing 130. At the same time within the stator-PCB assembly 210 the PCB 120 is still locked at the openings 122 by one or more first mounting feet 114. A certain standoff distance between PCB 120 and stator sub-assembly 110 does not change in this process.

Figure 7:
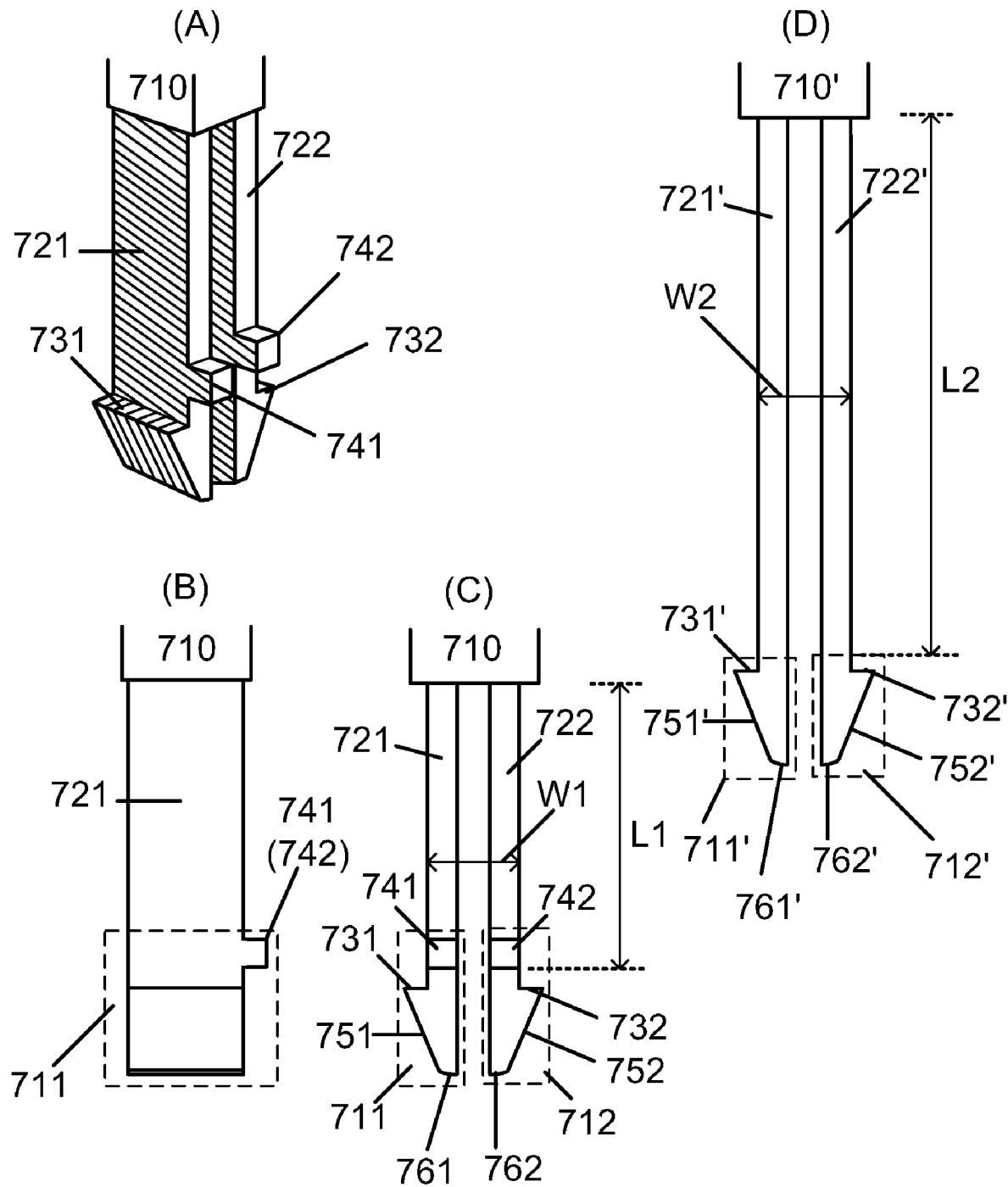
FIG. 7 is an exemplary diagram showing a combination of two types of mounting feet with respective two end structures according to an embodiment of the invention.

FIG. 7 is an exemplary diagram showing a combination of two types of mounting feet with respective two end structures according to an embodiment of the invention. This diagram is merely an example, which should not unduly limit the scope of the claims herein. One of ordinary skill in the art would recognize many variations, alternatives, and modifications. FIG. 7 is divided into four parts. As shown, part (A) of FIG. 7 is a perspective view of one of the first type of mounting feet including two prongs 721 and 731, each of which is extended from a base 710 to an end structure. In one embodiment, the two prongs 721 and 722 are substantially similar in shape and parallel to each other with a distance apart. The end structure associated with the prong 721/722 includes a locking tang 731/732 and an interference tab 741/742. Additionally in a side view shown by part (C) of FIG. 7, the locking tang 731/732 is connected to a tip 761/762 by a sloped side edge 751/752. In an specific embodiment, the locking tang 731 is a step protruded out from an outer side of the prong 721, which is just opposite to the step of the locking tang 732. In another specific embodiment, the interference tab 741 is disposed on another side of the prong 721 with a certain distance above the locking tang 731, as illustrated in another side view shown by part (B) of FIG. 7. Of course, one skilled in the art can find many alternatives, variations, and modifications in the end structures of the two prongs. For example, the two interference tabs 741 and 742 can be disposed to be protruded out in the same direction (as seen in part (B)) or can be in the just opposite direction (not shown). In general the end structure 711, marked by the dashed line enclosure, can be configured to provide a desired locking function for the first type of mounting feet depending on certain locking mechanism required for the stator assembly within the fan motor.

Part (C) of FIG. 7 further shows the two prongs 721 and 722 being spaced apart by a gap distance. The gap distance plus the thickness of the prongs constitute a width W1 for the mounting feet. Each prong 721 or 722 is associated with a length L1 measured from the base 710 to the end structure 711. Additionally in this angle the sloped side edges 751 and 752 between the locking tang and the tip of the end structure 711 are clearly seen. In one example, the first mounting feet 112 associated with the stator 110 are substantially the same as the first type of mounting feet comprising all the above structural elements.

In one embodiment, the first type of mounting feet shown in Parts (A-C) of FIG. 7 are used in combination with a second type of mounting feet as shown in part (D) of FIG. 7, which is a side view in a same angle of part (C) of FIG. 7. As shown, the second type of mounting feet includes two prongs 721' and 722' spaced apart with a total width W2 and extended from a base 710' to end structures 711' and 712' by a length L2. The base 710' and the base 710 can be an integral part of the stator insulator. The end structures 711' and 712' are without the interference tabs comparing to the end structure 711 and 712, but are substantially similar in other elements including two locking tangs 731'/732' connected by respective sloped side edges 751'/752' to their tips 761'/762'. In one example, the second mounting feet 114 associated with the stator 110 are substantially the same as the second type of mounting feet described above. According to certain embodiments of the present invention, the stator assembly uses a combination of both the first type of mounting feet and the second type of mounting feet for mounting a PCB to the stator with a standoff distance and at the same time detachably mounting the stator-PCB assembly to a fan housing with another standoff distance. In one embodiment, the locking mechanism associated with the first type mounting feet is a kind of detachable snap fitting mechanism with double locks. In another embodiment, the locking mechanism associated with the second type mounting feet is another kind of detachable snap fitting mechanism with single lock. Of course, there can be many variations, alternatives, and modifications in the physical structures with specific detachable locking mechanisms.

Figure 8:
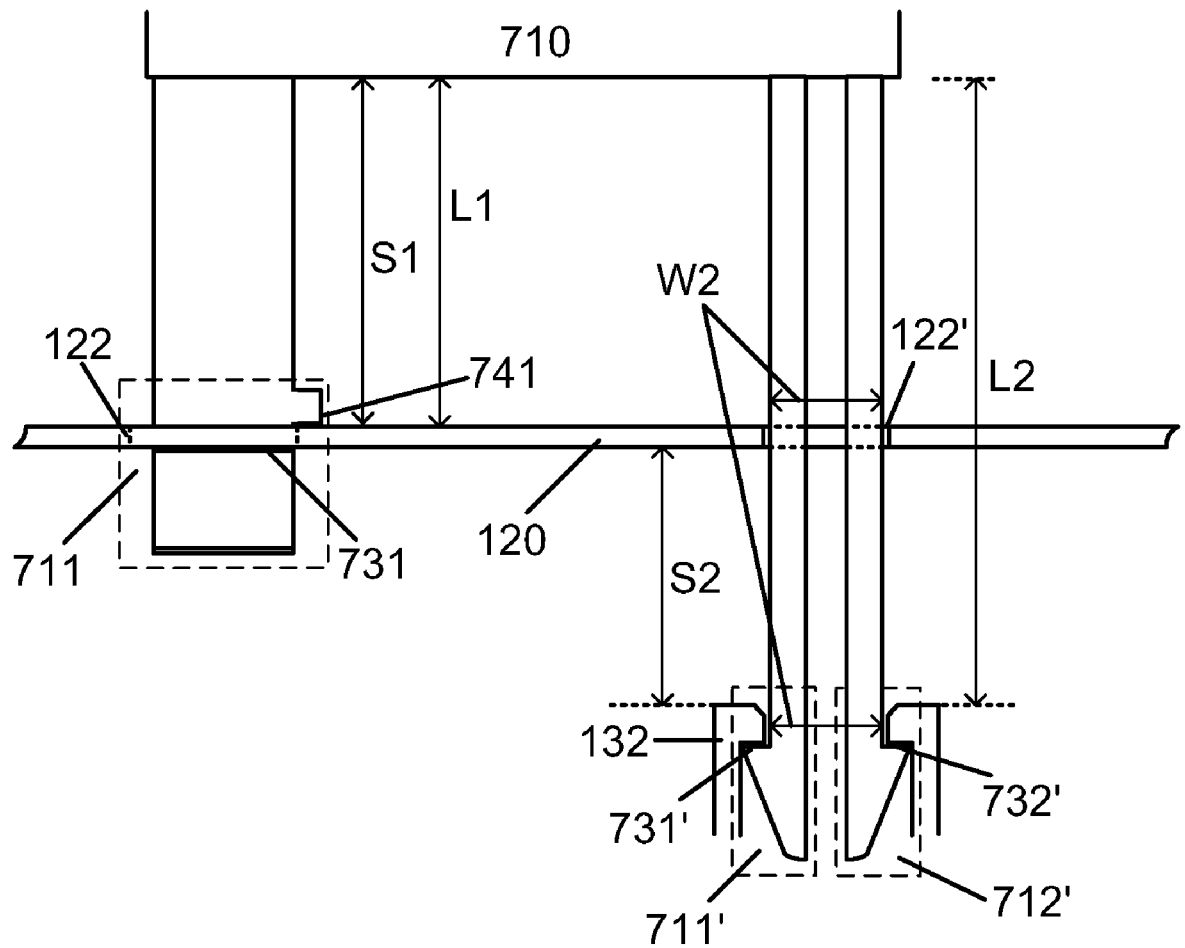
FIG. 8 is a schematic side view partially illustrating a PCB mounted in between a stator and a base member of fan housing according to one embodiment of the invention.

FIG. 8 is a schematic side view illustrating a PCB mounted between a stator and a base member according to one embodiment of the invention. This diagram is merely an example, which should not unduly limit the scope of the claims herein. One of ordinary skill in the art would recognize many variations, alternatives, and modifications. As shown, two types of mounting feet extended from a common stator base 710 are disposed apart from each other. A first mounting foot serves for locking one opening 122 of the PCB 120 with an end structure 711 thereof. A second mounting foot serves for passing through another opening 122' of the PCB 120 and extending further to lock with an opening 132 in a base member of a fan housing (not fully shown) with an end structure 711' (or 712').

In particular, the first mounting foot comprises two separately disposed prongs (shown only as single one in this angle of the side view) that are deformable to allow the end structure 711 to be engaged with the opening 122 with proper size, shape, and orientation in the PCB 120. The end structure 711, as shown in part A-C of FIG. 7, includes a locking tang 731 and an interference tab 741 disposed a distance apart from each other on different sides of each prong. The distance is predetermined to be substantially equal to a thickness of the PCB 120. Therefore, the end structure 711 in the deformed state is allowed a partial insertion into the opening 122 so that the locking tang 731 now is below the PCB 120 while the interference tab 741 is above the PCB 120. Thereafter the end structure 711 is in a relaxed state in which the locking tang 731 now is in position to be against an edge of the opening 122 for preventing further advancement (down) of the first mounting foot. At the same time, the interference tab 741 is also in position to be against another edge of the opening 122 for preventing automatic retraction of the same first mounting foot out of the opening 122. This results in locking of the end structure of the first mounting foot at one of the openings in the PCB, correspondingly forming a standoff distance S1 between the stator base and top surface of the PCB. Of course, the standoff distance S1 is by design substantially the same as the length L1 of the first mounting foot (see definition in part (C) of FIG. 7). Of course, there can be many variations, alternatives, and modifications.

In association with the locking between the stator and the PCB, the second mounting foot is utilized for mounting the stator with a fan housing base. In an example shown in FIG. 8, the second mounting foot comprises two separately disposed prongs 721' and 722' spaced apart by a width W2 and each prong is extended from the stator base 710 to an end structure 711' or 712' and is made of strong but deformable material. The end structures 711' and 712', as shown in part D of FIG. 7, respectively includes a locking tang 731' and 732' disposed on opposite sides of corresponding prong 721' and 722'. The space between the two deformable prong allows them to be squeezed toward each other. In one embodiment, the deformation of the second mounting foot allows its passage through an opening 122' at corresponding position in the PCB 120 and further allows an insertion of the end structures 711' and 712' into the opening 132 in the fan housing base member (not fully shown). At the same time, the opening 132 is configured with a proper size, orientation, and specially an L-shaped edge structure to mate with the to-be-inserted end structures 711' and 712' of the second mounting foot. Therefore, the opening 132 not only allows the insertion of the end structures in their deformed states but also prevents an automatic retraction of the end structures in their relaxed states by using the L-shaped edge structure to block the locking tangs 731' and 732' respectively.

Additionally, if the two end structures 711' and 712' are properly deformed towards each other using a disassembly tool or even manually, the second mounting foot is capable of retracting out of the opening 132 to allow the stator-PCB assembly being released from the fan housing. For example, the disassembly tool 240 shown in FIGS. 1-6 can be applied to deform the two end structures 711' and 712'. In one example, the end structures 711' and 712' are configured to have a sloped side edges that is mated with a shaped release key of the disassembly tool. As the shaped release key is pushed upward (may be guided by interior side walls of the opening 132 with extra length), the end structures 711' and 712' are squeezed toward each other. This results in locking of the end structures of the second mounting foot with the base member, correspondingly forming another standoff distance S2 between the PCB 120 and top portion of the opening 132. In this embodiment shown in FIG. 8, the second mounting foot of the stator is configured to have a length L2 that matches substantially a sum of a desired standoff distance S2 and a standoff distance S1 designed by the first mounting foot of the same stator.

Figure 9:
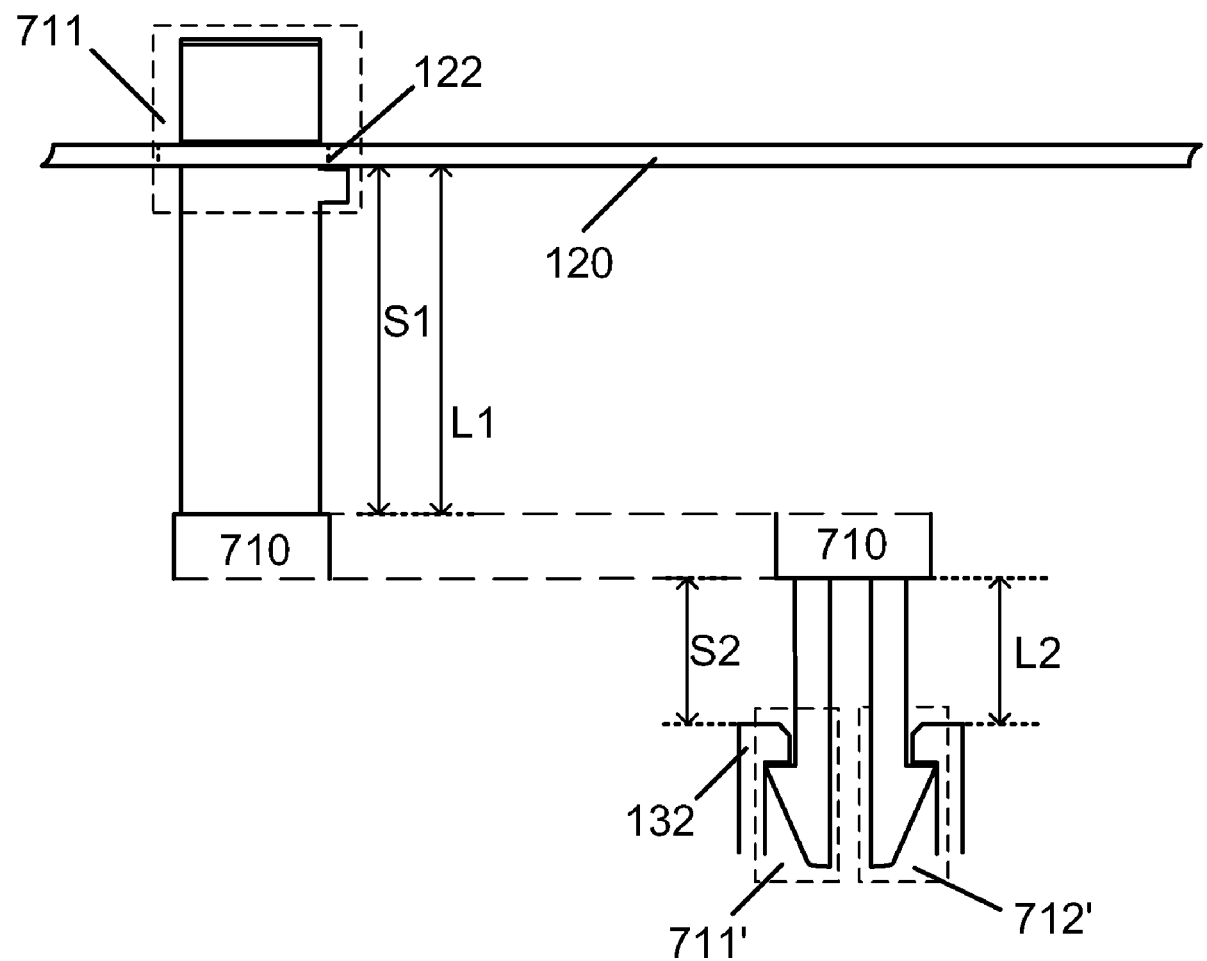
FIG. 9 is a schematic side view partially illustrating a PCB and a base member each is mounted on different side of the stator according to another embodiment of the invention.

FIG. 9 is a schematic side view illustrating a partial stator mounted with a PCB on one side and a base member on another side according to another embodiment of the invention. This diagram is merely an example, which should not unduly limit the scope of the claims herein. One of ordinary skill in the art would recognize many variations, alternatives, and modifications. FIG. 9 just provides an alternative method of mounting the stator-PCB assembly to the fan housing. All structural elements in FIG. 9 can be made the same as those in FIG. 8 except the first mounting foot is extended in an opposite direction versus the second mounting foot from two sides of a same stator. Further, the locking mechanisms associated with either the first mounting foot or the second mounting foot shown in FIG. 9 can be substantially the same as those shown in FIG. 8. As a result, the PCB is now mounted above the stator with a standoff distance S1 and the stator is mounted above the base member of the fan housing by another standoff distance S2. In this alternative embodiment, the second mounting foot of the stator is configured to have a length L2 substantially equal to a standoff distance S2 for the base member while the first mounting foot with a length L1 of the same stator is designed to give a standoff distance S1 for the PCB.

Many benefits can be achieved by embodiments of the present invention. Certain embodiments of the invention provide a simple structural combination of two types of mounting feet for the stator so that the stator can be mounted with a PCB and to a stator assembly housing in separated positions. Specific embodiments of the invention provide a locking mechanism associated with a first type of mounting feet of the stator for forming a stator-PCB assembly in which the PCB is detachably coupled to the stator with a standoff distance. At the same time, the embodiments provide another locking mechanism associated with a second type of mounting feet of the stator for easily assembling or disassembling the stator-PCB assembly to a base member of the fan housing. The stator-PCB assembly is detachably mounted to the base member with another standoff distance. Some embodiments of the invention show mounting feet structural designs utilizing one or more exemplary snap fitting mechanisms for achieving the desired locking. In particular, the improved mounting method allows easy assembly and disassembly of the stator-PCB assembly to the housing of a fan motor, which is able to improve manufacturing efficiency and product quality control for various fan motor products.

It is also understood that the examples and embodiments described herein are for illustrative purposes only and that various modifications or changes in light thereof will be suggested to persons skilled in the art and are to be included within the spirit and purview of this application and scope of the applied claims.

What is claimed is:

1. A stator assembly detachably mounted within a fan housing, the stator assembly comprising:
   a stator including a first central hole, one or more first mounting feet disposed about the first central hole, and one or more second mounting feet disposed apart from the one or more first mounting feet;
   a printed circuit board (PCB) including a second central hole and one or more first openings disposed about the second central hole; and
   a fan housing including a base member fixedly coupled to a bearing liner, the base member including one or more second openings disposed about the bearing liner;
   wherein:
   the stator is coupled to the PCB into a stator-PCB assembly with each of the one or more first mounting feet being locked with one of the one or more first openings, each of the one or more first mounting feet comprises two prongs each having a first length and a first end structure including at least a first locking tang and an interference tab disposed apart from each other by a gap along the first length;
   the two prongs are spaced apart by a predetermined distance substantially equal to a lateral dimension of said one of the one or more first openings and deformable to allow the corresponding first mounting feet being inserted through said one of the one or more first openings; and
   the stator-PCB assembly is coupled to the fan housing with each of the one or more second mounting feet locked with one of the one or more second openings and with both the first central hole and the second central hole center-aligned with respect to and disposed around the bearing liner.

2. The stator assembly of claim 1 wherein the stator-PCB assembly forms via a first locking mechanism characterized by locking a PCB with a thickness between the first locking tang and the interference tab with the gap no smaller than the thickness and by keeping a standoff distance between the locked PCB and the stator.

3. The stator assembly of claim 2 wherein the standoff distance is substantially equal to the first length measured from the stator to the interference tab.

4. The stator assembly of claim 2 wherein the first locking mechanism is associated with the first end structure using the first locking tang to block a retraction of said two prongs against one edge of said one of the one or more first openings and at the same time using the interference tab to prevent further advancement of said two prongs against another edge of the same one of the one or more first openings.

5. A stator assembly detachably mounted within a fan housing, the stator assembly comprising:
   a stator including a first central hole, one or more first mounting feet disposed about the first central hole, and one or more second mounting feet disposed apart from the one or more first mounting feet, the one or more second mounting feet comprises two prongs each having a second length and a second end structure including at least a second locking tang;

a printed circuit board (PCB) including a second central hole and one or more first openings disposed about the second central hole; and a fan housing including a base member fixedly coupled to a bearing liner, the base member including one or more second openings disposed about the bearing liner;

wherein:
the stator is coupled to the PCB into a stator-PCB assembly with each of the one or more first mounting feet being locked with one of the one or more first openings;

the stator-PCB assembly is coupled to the fan housing via a second locking mechanism characterized by snap fitting the second locking tang against one edge of said one of the one or more second openings and keeping a standoff distance between the stator and the base member;

each of the one or more second mounting feet comprises two prongs each having a second length and a second end structure including at least a second locking tang;

the second locking mechanism is detachable at least using a disassembly tool including one or more release keys configured to mate and deform the second locking tang associated with the two prongs of each of the one or more second mounting feet; and the stator-PCB assembly is coupled to the fan housing with each of the one or more second mounting feet locked with one of the one or more second openings and with both the first central hole and the second central hole center-aligned with respect to and disposed around the bearing liner.

6. A stator assembly kit for manufacture of a fan motor, the stator assembly kit comprising:

a stator-PCB assembly including a stator co-axially coupled to a printed circuit board (PCB), the stator including one or more first mounting feet disposed apart from each other and one or more second mounting feet disposed apart from the one or more first mounting feet, the PCB including one or more first openings aligned with the one or more first mounting feet and one or more second openings aligned with the one more second mounting feet;

a fan housing including a base member having one or more third openings; and a disassembly tool including a plate having one or more release keys;

wherein:
each of the one or more first mounting feet is locked on one of the one or more first openings with a first standoff distance between the stator and the PCB;

each of the one or more second mounting feet is passed through one of the one or more second openings and extended further to lock on one of the one or more third openings with a second standoff distance between the base member and the PCB;

each of the one or more release keys is configured to unlock each of the one or more second mounting feet from the one of the one or more third openings, thereby releasing the stator-PCB assembly from the base member.

7. The stator assembly kit of claim 6 wherein each of the one or more first mounting feet comprises two prongs each including a first end structure and a first length measured from the stator to the first end structure.

8. The stator assembly kit of claim 7 wherein the two prongs are spaced apart by a predetermined width substantially equal to a lateral dimension of one of the one or more first openings and deformable to allow the first mounting feet passing through said one of the one or more first openings.

9. The stator assembly kit of claim 7 wherein the first length is substantially the same as the first standoff distance between the stator and the PCB.

10. The stator assembly kit of claim 7 wherein the first end structure comprises a first locking tang disposed on one side of a prong and an interference tab disposed on another side of the prong, the first locking tang being spaced apart from the interference tab by a gap along the first length, the gap being substantially equal to a thickness of the PCB.

11. The stator assembly kit of claim 10 wherein the first end structure further comprises a locking mechanism that utilizes the first locking tang to block a retraction of the first mounting feet against an edge of said one of the one or more first openings and at the same time utilizes the interference tab to prevent further advancement of the first mounting feet against another edge of said one of the one or more first openings.

12. The stator assembly kit of claim 6 wherein each of the one or more second mounting feet comprises two prongs each including a second end structure and having a second length measured from the stator to the second end structure.

13. The stator assembly kit of claim 12 wherein the two prongs are spaced apart by a predetermined width smaller than a lateral dimension of one of the one or more second openings.

14. The stator assembly kit of claim 13 wherein the predetermined width is further substantially equal to a lateral dimension of one of the one or more third openings and the two prongs are deformable to allow the second mounting feet being inserted through the one of the one or more third openings.

15. The stator assembly kit of claim 12 wherein the second length is substantially equal to a sum of the first standoff distance and the second standoff distance as the PCB is mounted between the stator and the base member.

16. The stator assembly kit of claim 12 wherein the second length is substantially equal to the second standoff distance as the stator is mounted between the PCB and the base member.

17. The stator assembly kit of claim 14 wherein the second end structure comprises at least a second locking tang disposed on one side of one of the two prongs forming a lateral size greater than the predetermined distance for blocking against an edge of one of the one or more third openings.

18. The stator assembly kit of claim 17 wherein the second end structure further comprises a detachable locking mechanism that allows the stator-PCB assembly to be released from the base member by deforming the second locking tang to reduce the lateral size smaller than the predetermined distance.

19. The stator assembly kit of claim 17 wherein each of the one or more release keys comprises a head structure configured to mate with the second end structure and deform the second locking tang to unlock the second mounting feet from corresponding one of the one or more third openings.

20. The stator assembly kit of claim 6 wherein:
the stator further includes a first center hole;
the PCB further includes a second center hole;
the base member is further coupled to a bearing liner;
the stator-PCB assembly is mounted to the fan housing with a co-axial alignment of the first center hole and the second center hole disposed around the bearing liner.

* * * * *